(12) United States Patent
Ding et al.

(10) Patent No.: US 12,429,244 B2
(45) Date of Patent: Sep. 30, 2025

(54) TEMPERATURE ADJUSTING DEVICE, AIR CONDITIONING SYSTEM, CONTROL METHOD, AND READABLE STORAGE MEDIUM

(71) Applicants: GD MIDEA HEATING & VENTILATING EQUIPMENT CO., LTD., Foshan (CN); HEFEI MIDEA HEATING & VENTILATING EQUIPMENT CO., LTD., Hefei (CN)

(72) Inventors: Yunxiao Ding, Foshan (CN); Lin Su, Foshan (CN); Libo Yan, Foshan (CN); Haitao Lei, Foshan (CN)

(73) Assignees: GD MIDEA HEATING & VENTILATING EQUIPMENT CO., LTD., Foshan (CN); HEFEI MIDEA HEATING & VENTILATING EQUIPMENT CO., LTD., Hefei (CN)

(*) Notice: Subject to any disclaimer, the term of this patent is extended or adjusted under 35 U.S.C. 154(b) by 69 days.

(21) Appl. No.: 18/262,730

(22) PCT Filed: Sep. 18, 2021

(86) PCT No.: PCT/CN2021/119389
§ 371 (c)(1),
(2) Date: Jul. 25, 2023

(87) PCT Pub. No.: WO2022/198944
PCT Pub. Date: Sep. 29, 2022

(65) Prior Publication Data
US 2024/0401835 A1    Dec. 5, 2024

(30) Foreign Application Priority Data
Mar. 24, 2021  (CN) .......................... 202110330496.9

(51) Int. Cl.
*F24F 11/84* (2018.01)
*F24F 1/14* (2011.01)
(Continued)

(52) U.S. Cl.
CPC ................ *F24F 11/84* (2018.01); *F24F 1/14* (2013.01); *F25B 41/20* (2021.01); *F25B 49/02* (2013.01)

(58) Field of Classification Search
CPC .. F25B 49/02; F25B 41/20; F25B 2400/0401; F24F 1/14; F24F 11/84
See application file for complete search history.

(56) References Cited

U.S. PATENT DOCUMENTS

2019/0310005 A1* 10/2019 Cluff ..................... F25B 31/026
2020/0309411 A1* 10/2020 Ukibune ................... F25B 5/04
2021/0018234 A1   1/2021 Lingrey et al.

FOREIGN PATENT DOCUMENTS

CN         103512274 A     1/2014
CN         104406328 A     3/2015
(Continued)

OTHER PUBLICATIONS

CN 205655422 (English translation) (Year: 2016).*
(Continued)

*Primary Examiner* — Jonathan Bradford
(74) *Attorney, Agent, or Firm* — K&L Gates LLP

(57) ABSTRACT

Embodiments provide a temperature adjusting device, an air conditioning system, a control method, and a readable storage medium. The temperature adjusting device includes: an evaporative cooling device, having an indoor air supply port and an outdoor air outlet; and a compressor device, including a compressor, a first heat exchanger, a second heat exchanger, a third heat exchanger, a first throttling component, a second throttling component, and a reversing valve.

(Continued)

The first heat exchanger exchanges heat with indoor air at the indoor air supply port and recovers waste heat, the second heat exchanger exchanges heat with outdoor air at the outdoor air outlet and recovers waste heat, and a refrigerant discharged by the compressor exchanges heat with a heat exchange medium in the third heat exchanger.

6 Claims, 7 Drawing Sheets

(51) Int. Cl.
*F25B 41/20* (2021.01)
*F25B 49/02* (2006.01)

(56) References Cited

FOREIGN PATENT DOCUMENTS

| CN | 205655422 U | 10/2016 |
|----|-------------|---------|
| CN | 110230864 A | 9/2019 |
| CN | 110411059 A | 11/2019 |
| CN | 111140950 A | 5/2020 |
| CN | 111520794 A | 8/2020 |
| CN | 211345639 U | 8/2020 |
| JP | 2012119547 A | 6/2012 |

OTHER PUBLICATIONS

First OA mailed Jul. 1, 2023 corresponding to CN Application No. 202110330496.9.
First Search Report mailed Jun. 28, 2023 corresponding to CN Application No. 202110330496.9.
ISR mailed Dec. 6, 2021 corresponding to International Application No. PCT/CN2021/119389.

* cited by examiner

TEMPERATURE ADJUSTING DEVICE, AIR CONDITIONING SYSTEM, CONTROL METHOD, AND READABLE STORAGE MEDIUM

CROSS-REFERENCES TO RELATED APPLICATIONS

The present disclosure is a national phase application of International Application No. PCT/CN2021/119389, filed on Sep. 18, 2021, which claims priority to Chinese Patent Application No. 202110330496.9 filed with China National Intellectual Property Administration on Mar. 24, 2021, the entireties of which are herein incorporated by reference.

FIELD

The present disclosure relates to the field of temperature adjustment, and particularly relates to a temperature adjusting device, an air conditioning system, a control method, and a readable storage medium.

BACKGROUND

A data center operates all year round, and thus continuously generates a large amount of heat. In order to cool the data center and dissipate heat, a large amount of energy needs to be consumed, and the energy consumption for cooling and dissipating heat accounts for approximately 30% of the total energy consumption of the data center. In addition, the heat generated by the operation of the data center is a rich waste heat resource. Currently, some data centers in the industry use indirect evaporative cooling technology for cooling and dissipating heat, and it further has the function of recovering waste heat, however, it has a complex structure, requires many components, and occupies large space.

SUMMARY

A first aspect of the present disclosure proposes a temperature adjusting device, including: an evaporative cooling device, including: a heat exchange core for exchanging heat between indoor air and outdoor air, and the heat exchange core includes an indoor air supply port and an outdoor air outlet; and a compressor device, including: a compressor; a first heat exchanger, provided at one side of the indoor air supply port, and connected to the refrigerant suction port of the compressor; a first throttling component with a first end connected to the first heat exchanger; a second heat exchanger, provided at one side of the outdoor air outlet; a second throttling component with a first end connected to the second heat exchanger; a reversing valve, having a first port, a second port, and a third port, and the first port is connected to the refrigerant discharge port of the compressor, the second port is connected to the second heat exchanger, and the third port is connected to the refrigerant suction port of the compressor; and a third heat exchanger with a first end connected to the refrigerant discharge port of the compressor, a second end connected to the second end of the first throttling component and further connected to the second end of the second throttling component, and the third heat exchanger being configured to exchange heat with a heat exchange medium.

A second aspect of the present disclosure proposes an air conditioning system, including the temperature adjusting device according to the above first aspect.

A third aspect of the present disclosure proposes a control method, which is used for the temperature adjusting device according to the above first aspect, including: obtaining an environment temperature and the user's heat demand; and determining the operation mode of the temperature adjusting device according to the environment temperature and the user's heat demand.

A fourth aspect of the present disclosure proposes another temperature adjusting device, including: a memory and a processor, and the memory stores a program or instruction that can be executed on the processor, and the steps of the control method according to the above third aspect are implemented when processor executes the program or instruction.

A fifth aspect of the present disclosure proposes a readable storage medium, on which a program or instruction is stored, and the steps of the control method according to the above third aspect are achieved when the processor executes the program or instruction.

Figure 1:
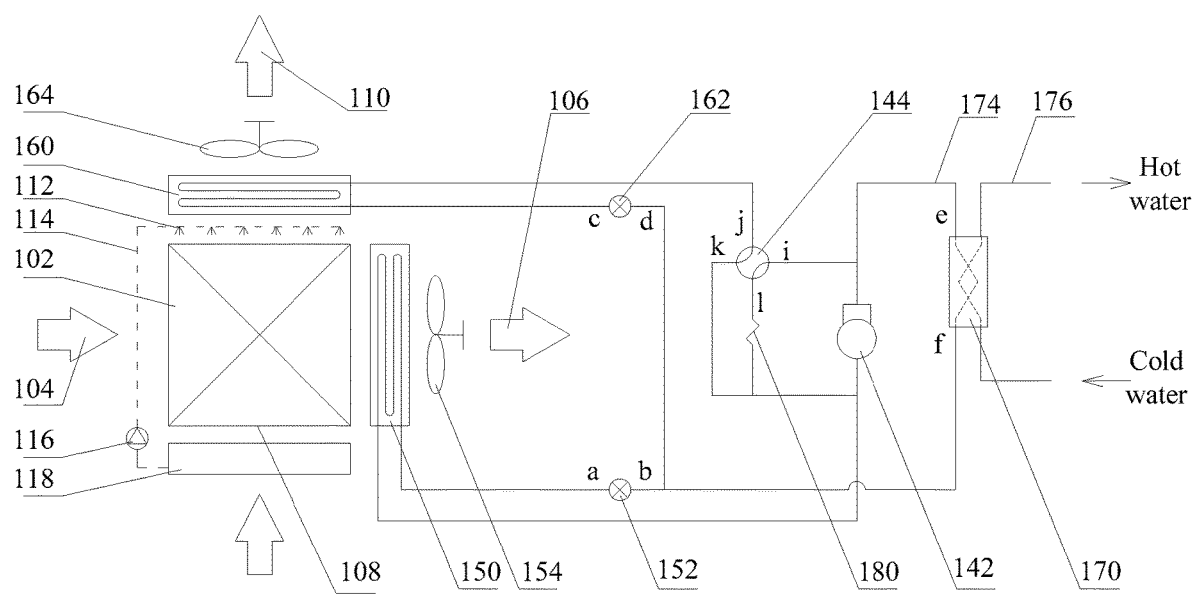
FIG. 1 is a schematic view of the working principle of a temperature adjusting device according to some embodiments of the present disclosure.

The corresponding relationships between the reference signs and the component names in FIG. 1 to FIG. 7 are as follows:

10: temperature adjusting device, 100: evaporative cooling device, 102: heat exchange core, 104: indoor return air inlet, 106: indoor air supply port, 108: outdoor air inlet, 110: outdoor air outlet, 112: spraying nozzle, 114: water pipe, 116: water pump, 118: water collection pan, 140: compressor device, 142: compressor, 144: reversing valve, 150: first heat exchanger, 152: first throttling component, 154: first draught fan, 160: second heat exchanger, 162: second throttling component, 164: second draught fan, 170: third heat exchanger, 172: third throttling component, 174: refrigerant pipeline, 176: water path, 180: capillary, 20: air conditioning system, 200: housing, 300: memory, and 302: processor.

DETAILED DESCRIPTION OF THE DISCLOSURE

In order to understand the embodiments of the present disclosure more clearly, a further detailed description of the embodiments of the present disclosure will be given below in combination with the accompanying drawings and specific embodiments. It should be noted that the features according to the embodiments of the present disclosure can be combined with each other if there is no conflict.

In the following description, numerous specific details are set forth in order to provide a thorough understanding of the embodiments of the present disclosure. However, the embodiments of the present disclosure can further be implemented in other manners than those described herein. Therefore, the protection scope of the embodiments of the present disclosure is not limited to the specific embodiments disclosed below.

Some embodiments provided by the present disclosure are described below with reference to FIG. 1 to FIG. 9.

As shown in FIG. 1 to FIG. 5, the embodiments of the present disclosure propose a temperature adjusting device 10, including an evaporative cooling device 100 and a compressor device 140. The evaporative cooling device 100 mainly uses outdoor cold air and water to exchange heat with and refrigerate indoor hot air, and the compressor device 140 mainly uses a refrigerant for refrigerating or heating.

The evaporative cooling device 100 includes a heat exchange core 102, and the heat exchange core 102 includes an indoor air supply port 106 and an outdoor air outlet 110. The heat exchange core 102 is for exchanging heat between the indoor air and the outdoor air, to help exchange heat with and cool the hot air caused by an indoor heat source through the outdoor cold air.

Through disposing the heat exchange core 102 which has the indoor air supply port 106 and the outdoor air outlet 110, the indoor air which is heated by the heat source can exchange heat with the outdoor cold air with a relatively low temperature in the heat exchange core 102, and the temperature of the indoor air is reduced. The indoor air with a reduced temperature can return to the interior through the indoor air supply port 106, and thus this provides an environment with a relatively lower temperature for the indoor heat source, and the heat source can be cooled and dissipate heat in real time. The outdoor air with an increased temperature returns to the outside through the outdoor air outlet 110, to take the heat from the heat source to the outside environment. Thus, when the outdoor temperature is relatively low, cooling and heat dissipation for the heat source can be achieved directly through the heat exchange between the outdoor air and the indoor air, and this does not need refrigeration by compressing and helps save energy and reduce consumption.

The compressor device 140 includes a compressor 142, a first heat exchanger 150, a second heat exchanger 160, a first throttling component 152, a second throttling component 162, a reversing valve 144 and a third heat exchanger 170. In some embodiments, the compressor 142 includes an refrigerant discharge port and an refrigerant suction port. The first heat exchanger 150 is provided at one side of the indoor air supply port 106 of the heat exchange core 102, to help supply air to the interior through the indoor air supply port 106 and then to exchange heat. The first heat exchanger 150 is further connected to the refrigerant suction port of the compressor 142. The first end a of the first throttling component 152 is connected to the first heat exchanger 150, and the second end b of the first throttling component 152 is connected to the second end f of the third heat exchanger 170. The second heat exchanger 160 is provided at one side of the outdoor air outlet 110 of the heat exchange core 102. The first end c of the second throttling component 162 is connected to the second heat exchanger 160, and the second end d of the second throttling component 162 is connected to the second end f of the third heat exchanger 170. The reversing valve 144 includes a first port i, a second port j, and a third port k. The first port i of the reversing valve 144 is connected to the refrigerant discharge port of the compressor 142, the second port j is connected to the second heat exchanger 160, and the third port k is connected to the refrigerant suction port of the compressor 142. The first end e of the third heat exchanger 170 is connected to the refrigerant discharge port of the compressor 142, the second end f of the third heat exchanger 170 is connected to the second end b of the first throttling component 152, the second end f of the third heat exchanger 170 is further connected to the second end d of the second throttling component 162, and the third heat exchanger 170 is for exchanging heat with a heat exchange medium.

The temperature adjusting device 10 according to the embodiments of the present disclosure is provided with the evaporative cooling device 100 and the compressor device 140, and the compressor device 140 includes the reversing valve 144, and different functions of the compressor device 140 can be achieved through the port switching of the reversing valve 144 and the control over the first throttling component 152 and the second throttling component 162, and this can ensure performing cooling and heat dissipation for a heat source, and can further make full use of the heat of the heat source and heat the heat exchange medium through the third heat exchanger 170, and then achieve the recovery of the waste heat of the heat source. In addition, when the outdoor temperature is relatively low, cooling and heat dissipation for the heat source can be performed directly through the evaporative cooling device 100, while the compressor device 140 can provide the heat from the refrigerant to the third heat exchanger 170, to heat the heat exchange medium and then fully use the heat energy. In addition, on the basis of the conventional evaporative cooling device 100 and the compressor device 140, the temperature adjusting device 10 provided by the embodiments of the present disclosure can achieve the recovery of the waste heat of the heat source while only a small number of components such as the reversing valve 144 and the second throttling component 162 are added. With respect to the evaporative cooling device in the related art, the temperature adjusting device 10 provided by the embodiments of the present disclosure has a simple structure, occupies a small space, and is of low equipment cost, and can control the temperature of the waste heat more accurately, and can better fully recover the waste heat discharged from the heat source in a precondition of meeting the needs of performing cooling and heat dissipation for the heat source.

In some embodiments, in different environment conditions, through the port switching of the reversing valve 144, the temperature adjusting device 10 can have multiple different operation modes.

For example, when the outdoor temperature is relatively low, performing cooling and heat dissipation for the heat source can be achieved through evaporative cooling or the method of completely natural cooling, and the heat generated by the compressor device 140 and the recovered waste heat of the heat source can be completely supplied to the third heat exchanger 170. Then, the temperature adjusting device 10 adopts a mode of completely natural cooling plus waste heat recovery, i.e., a first operation mode in which waste heat is recovered while the natural cooling goes on. It can be understood that when an indoor air supply temperature is lower than or equal to an indoor air supply setting temperature, the mode of completely natural cooling plus waste heat recovery can be maintained continuously. As shown in FIG. 1, in the mode of completely natural cooling plus waste heat recovery, i.e., in the first operation mode, the second port j and the third port k of the reversing valve 144 are connected and the second heat exchanger 160 is connected to the refrigerant suction port of the compressor 142, and the second throttling component 162 is opened and the first throttling component 152 is closed. After discharged from the refrigerant discharge port of the compressor 142, the refrigerant of high temperature and high pressure generated during the working of the compressor 142 flows into the third heat exchanger 170 to exchange heat with the heat exchange medium. When the heat exchange medium is water, hot water can be supplied to users through heat exchange. When the heat exchange medium is air, heat can be directly supplied to users through the heat exchange. After the refrigerant exchanges heat with the heat exchange medium, the temperature is lowered, and it can only flow towards the second throttling component 162 since the first throttling component 152 is closed. After depressurized through the second throttling component 162, the refrigerant becomes a liquid of low temperature and low pressure and enters the second heat exchanger 160. Since the second heat exchanger 160 is provided at the outdoor air outlet 110, at this moment, the air discharged out of the outdoor air outlet 110 has exchanged heat with the indoor hot air, the temperature rises, and thus, when the outdoor air subjected to heat exchange is discharged from the outdoor air outlet 110, the outdoor air exchanges heat with the refrigerant liquid with a lowered temperature in the second heat exchanger 160, then the heat of the heat source sucked from the indoor hot air is transmitted to the refrigerant in the second heat exchanger 160, and thus the temperature of the refrigerant rises. After the refrigerant in the second heat exchanger 160 exchanges heat and then its temperature rises, the refrigerant flows towards the reversing valve 144. The second port j and the third port k of the reversing valve 144 are connected, and the refrigerant flows to the refrigerant suction port of the compressor 142 through the second port j and the third port k, and thus the waste heat is brought back to the compressor 142. In the next circulation, the waste heat is brought to the third heat exchanger 170 again by the refrigerant of high temperature and high pressure discharged from the compressor 142, to achieve the recovery and use of the waste heat.

In the above process, performing cooling and heat dissipation for the heat source, for example, a data center, is achieved completely by the exchange between the outdoor cold air and the indoor hot air, and the heat is brought to the outdoor air through the indoor air, then the outdoor air further transmits the heat to the refrigerant, and the refrigerant transmits the heat to the heat exchange medium through the compressor 142 and the third heat exchanger 170, to achieve the heat recovery. Such a temperature adjusting device 10 can not only achieve cooling and heat dissipation for the heat source, but further recover and use the heat generated by the heat source, and a small number of components are added, the space occupied is small, and the heat of the heat source can be fully used in a precondition of meeting the needs of the indoor air supply temperature and the cooling capacity, and this helps save energy and reduce consumption.

It needs to be indicated that the outdoor environment temperature is relatively low, which means that the outdoor air inlet temperature is lower than an outdoor air inlet critical temperature. More specifically, the outdoor air inlet temperature can include an outdoor air inlet dry-bulb temperature and an outdoor air inlet wet-bulb temperature, and either of the two temperatures is lower than or equal to a critical value, i.e., the outdoor air inlet dry-bulb temperature is lower than or equal to an outdoor air inlet critical dry-bulb temperature, or the outdoor air inlet wet-bulb temperature is lower than or equal to an outdoor air inlet critical wet-bulb temperature, and when either of the two is satisfied, it can be deemed that the outdoor air inlet temperature is lower than or equal to an outdoor air inlet critical temperature value, i.e., the above mentioned case that the outdoor environment temperature is relatively low.

In some embodiments, it is possible that the indoor air supply temperature is greater than the indoor air supply setting temperature, or the outdoor air still cannot cool the indoor return air to a required temperature after the outdoor air has been subjected to the heat exchange of the heat exchange core, for example, the indoor air supply setting temperature, and in this case, the operation mode of the temperature adjusting device 10 needs to be changed, a mode of compression refrigeration in combination with waste heat recovery is adopted, the first heat exchanger 150 is for supplementing refrigeration, and the indoor air supply temperature meets the requirement. Still as shown in FIG. 1, in some embodiments, being different from the first operation mode, at this moment, the second throttling component 162 is closed, the first throttling component 152 is opened, and the second port j and the third port k of the reversing valve 144 are disconnected. After flowing out of the refrigerant discharge port of the compressor 142, the refrigerant firstly enters the third heat exchanger 170 to exchange heat with the heat exchange medium and then lower temperature, and then the temperature of the heat exchange medium rises. Then, the refrigerant flows towards the first throttling component 152, then flows to the first heat exchanger 150 to exchange heat with the indoor air supply, and takes the heat of the indoor heat source and finally flows back into the compressor 142.

In addition, it is further possible that the outdoor environment temperature is relatively high and greater than a critical value. For example, the outdoor air inlet wet-bulb temperature is greater than the outdoor air inlet critical wet-bulb temperature, and then the evaporative cooling device 100 still can be configured to refrigerate, and compression refrigeration is operated for assistance, i.e., the mode of evaporative compression refrigeration plus waste heat recovery, or the mode of evaporative compression refrigeration plus partial waste heat recovery is adopted, and the specific mode can be determined according to the user's heat demand.

For example, the outdoor air inlet wet-bulb temperature is greater than the outdoor air inlet critical wet-bulb temperature, and the user's heat demand is large, that is, the user's heat demand is larger than the heat supply amount of the temperature adjusting device 10, and then the mode of evaporative compression refrigeration plus waste heat recovery can be adopted.

In some embodiments, in the mode of evaporative compression refrigeration plus waste heat recovery, the compressor 142 is opened to supplement refrigeration, to continuously cool the indoor return air flowing from the heat exchange core 102. In some embodiments, as shown in FIG. 1, in the mode, the second port j and the third port k of the reversing valve 144 are connected. Both the first throttling component 152 and the second throttling component 162 are opened. After discharged from the refrigerant discharge port of the compressor 142, the refrigerant flows towards the third heat exchanger 170, and exchanges heat with the heat exchange medium in the third heat exchanger 170, to provide heat to users through the heat exchange medium. After the heat exchange is accomplished in the third heat exchanger 170, the refrigerant is divided into two paths and flows. One path flows towards the first throttling component 152, and exchanges heat with the indoor air supply through the first heat exchanger 150 and then its temperature rises, and then this path flows back to the compressor 142 while takes the waste heat transmitted by the indoor air supply. The other path flows towards the second throttling component 162, and exchanges heat with the outdoor air discharge through the second heat exchanger 160 and then its temperature rises, and then this path flows back to the compressor 142 through the second port j and the third port k of the reversing valve 144, thus the waste heat transmitted by the outdoor air discharge is brought to the compressor 142, and after the compression of the compressor 142, the waste heat brought by the two paths of refrigerant is transmitted to the heat exchange medium at the third heat exchanger 170 in the next circulation. The first heat exchanger 150 and the second heat exchanger 160 respectively recover the waste heat from the indoor air supply and the outdoor air discharge. Thus, as the heat exchange amount of the first heat exchanger 150 is not sufficient to meet the needs of users, the waste heat is recovered from both the first heat exchanger 150 and the second heat exchanger 160 at the same time, to recover more waste heat, improving the waste heat recovery rate, and meeting the user's heat demand as much as possible.

When the outdoor air inlet wet-bulb temperature is greater than the outdoor air inlet critical wet-bulb temperature, and the user's heat demand is small, i.e., the user's heat demand is smaller than the heat supply amount of the temperature adjusting device, it is only necessary to recover a portion of the waste heat for use, and then the mode of evaporative compression refrigeration plus partial waste heat recovery can be adopted.

Figure 2:
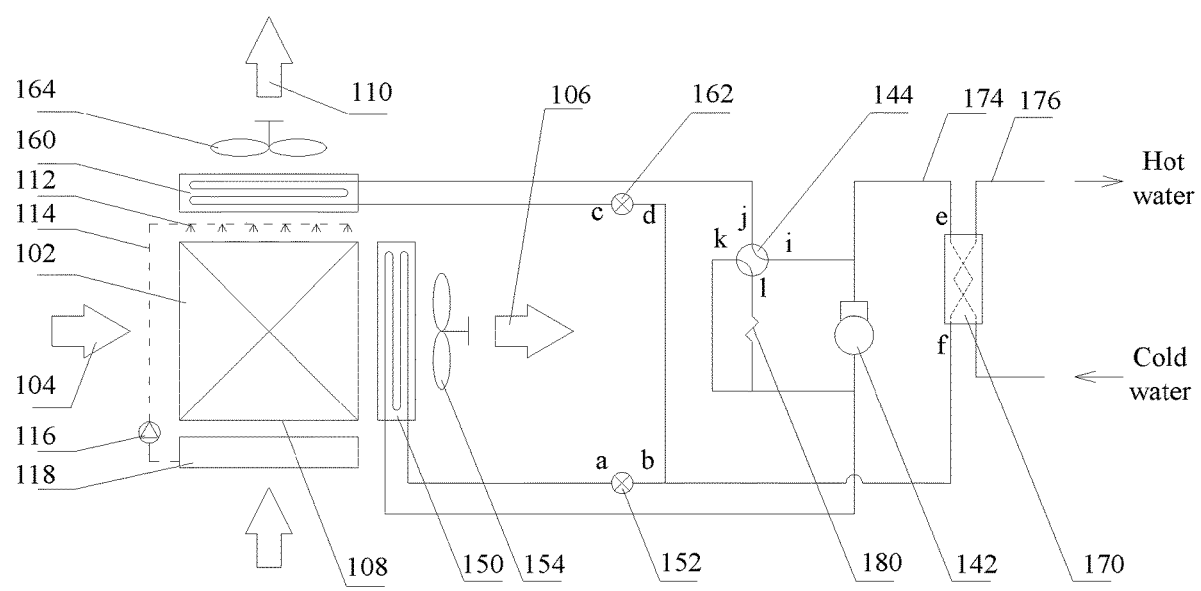
FIG. 2 is a schematic view of the working principle of a temperature adjusting device according to some embodiments of the present disclosure.

In the mode of evaporative compression refrigeration plus partial waste heat recovery, it is still necessary to open the compressor 142 to supplement refrigeration and help recover a portion of the waste heat, and unwanted waste heat is discharged to the outdoor environment through the outdoor air outlet 110. As shown in FIG. 2, the first port i and the second port j of the reversing valve 144 are connected, and the second port j and the third port k are disconnected. After the refrigerant flows out of the refrigerant discharge port of the compressor 142, one path still flows towards the third heat exchanger 170, the temperature is reduced after it exchanges heat with the heat exchange medium, then the path for refrigerant flows towards the first throttling component 152, and flows towards the first heat exchanger 150 after depressurized through the first throttling component 152, and exchanges heat with the indoor air discharged from the indoor air supply port 106 at the first heat exchanger 150, takes a portion of the heat of the heat source, and then returns to the refrigerant suction port of the compressor 142. After the refrigerant flows out of the refrigerant discharge port of the compressor 142, the other path for the refrigerant flows towards the second heat exchanger 160 through the first port and the second port j of the reversing valve 144, and exchanges heat with the air discharged out of the outdoor air outlet 110 at the second heat exchanger 160, and is depressurized through the second throttling component 162, then flows towards the first throttling component 152, and after depressurized once again together with the refrigerant previously flowing out of the refrigerant discharge port of the compressor 142, the refrigerant flows towards the first heat exchanger 150 for heat exchange and then flows back to the compressor 142.

Furthermore, the first throttling component 152 and/or the second throttling component 162 at least include any one of: a hand expansion valve, a float expansion valve, a thermal expansion valve and an electronic expansion valve.

The opening of at least one of the first throttling component 152 and the second throttling component 162 is adjustable. Through adjusting the frequency conversion of the compressor 142 and adjusting the opening of the first throttling component 152 and/or the second throttling component 162, the control over the temperature of the heat exchange medium of the third heat exchanger 170 can be achieved in a precondition of meeting the needs of performing cooling and heat dissipation for the heat source.

It can be understood that the compressor device 140 further includes a controller. The controller is electrically connected to the first throttling component 152 and/or the second throttling component 162, and is for controlling the opening of the first throttling component 152 and/or the second throttling component 162.

Through disposing the controller and connecting the controller with the first throttling component 152 and/or the second throttling component 162, users do not need to manually control the opening of the first throttling component 152 and the second throttling component 162, but control the opening through the controller, and this can improve the convenience of control over the temperature adjusting device 10 and simplify the operation of users. Or, the controller can automatically adjust the opening of the first throttling component 152 and the second throttling component 162 automatically according to the condition of the environment temperature and the user's heat demand, and thus, the automatic and accurate control over the temperature of the heat exchange medium of the third heat exchanger 170 can be achieved in a precondition of meeting the needs of performing cooling and heat dissipation for the heat source.

It can be understood that the controller can further be electrically connected to the compressor 142 to adjust the temperature of the heat exchange medium through adjusting the power of the compressor 142 by the controller, and this helps increase temperature adjusting methods.

Furthermore, in order to accurately control the indoor air supply temperature and the temperature of the heat exchange medium, on the basis of the above embodiments, in some embodiments, the compressor device 140 further includes a number of temperature sensors. In some embodiments, the compressor device 140 further includes a first temperature sensor and a second temperature sensor, and both the first temperature sensor and the second temperature sensor are electrically connected to the controller. And the first temperature sensor is for obtaining the outdoor air inlet temperature, for example, the outdoor air inlet dry-bulb temperature and/or wet-bulb temperature. The second temperature sensor is for obtaining the temperature of the heat exchange medium of the inlet end of the third heat exchanger 170. The controller is further for controlling the operation mode of the temperature adjusting device 10 based on the outdoor air inlet temperature and the user's heat demand.

Furthermore, the user's heat demand can be inputted directly by users or determined approximately according to some parameters. For example, the user's heat demand is determined according to the temperature of the heat exchange medium of the inlet end of the third heat exchanger 170. It can be understood that the lower the temperature of the heat exchange medium of the inlet end of the third heat exchanger 170 is, the greater the user's heat demand is. The user's heat demand can be determined approximately as long as a heat exchange medium critical temperature is set. In some embodiments, when the temperature of the heat exchange medium of the inlet end of the third heat exchanger 170 is lower than or equal to the heat exchange medium critical temperature, it is determined that the user's heat demand is large, and then the waste heat is generally recovered completely. When the temperature of the heat exchange medium of the inlet end of the third heat exchanger 170 is greater than the heat exchange medium critical temperature, it is determined that the user's heat demand is small, and then the waste heat is generally recovered partially.

The controller is further for controlling the opening of the first throttling component 152 and/or the second throttling component 162 based on the outdoor air inlet temperature and the temperature of the heat exchange medium of the inlet end of the third heat exchanger 170.

It can be understood that the lower the outdoor temperature is, the better the cooling and heat dissipation effect of the evaporative cooling device 100 is, and the user's heat demand is generally greater. However, when the outdoor temperature is relatively high, the cooling and heat dissipation effect of the evaporative cooling device 100 is relatively bad, and the compressor 142 is generally needed to supplement refrigeration. Therefore, through detecting the outdoor environment temperature, the operation mode of a device can be flexibly adjusted in time according to the condition of the outdoor temperature, to improve the cooling and heat dissipation effect and the waste heat recovering effect, and helping save energy and reduce consumption. In addition, through adjusting the opening of the first throttling component 152 and/or the second throttling component 162, the pressure and the temperature of the refrigerant is adjustable, and thus the adjustment to the waste heat recovering effect and the temperature of the heat exchange medium is achieved, and this not only helps the waste heat recovery, but further ensures the user's heat demand.

In other embodiments, the compressor device further includes a third temperature sensor. The third temperature sensor is electrically connected to the controller. The third temperature sensor is for obtaining the indoor air supply temperature. Through disposing the third temperature sensor, more reference data can be provided when the operation mode of the temperature adjusting device 10 is determined. For example, in the case that the outdoor air inlet dry-bulb temperature is lower than or equal to an outdoor air inlet dry-bulb critical temperature while the indoor air supply temperature is greater than the indoor air supply critical temperature, it is possible that there is a problem in the pipe, and the purpose of performing cooling and heat dissipation for the heat source cannot be achieved only by natural evaporative cooling, and therefore, the operation mode of the temperature adjusting device 10 needs to be adjusted, and compression refrigeration is added.

Figure 3:
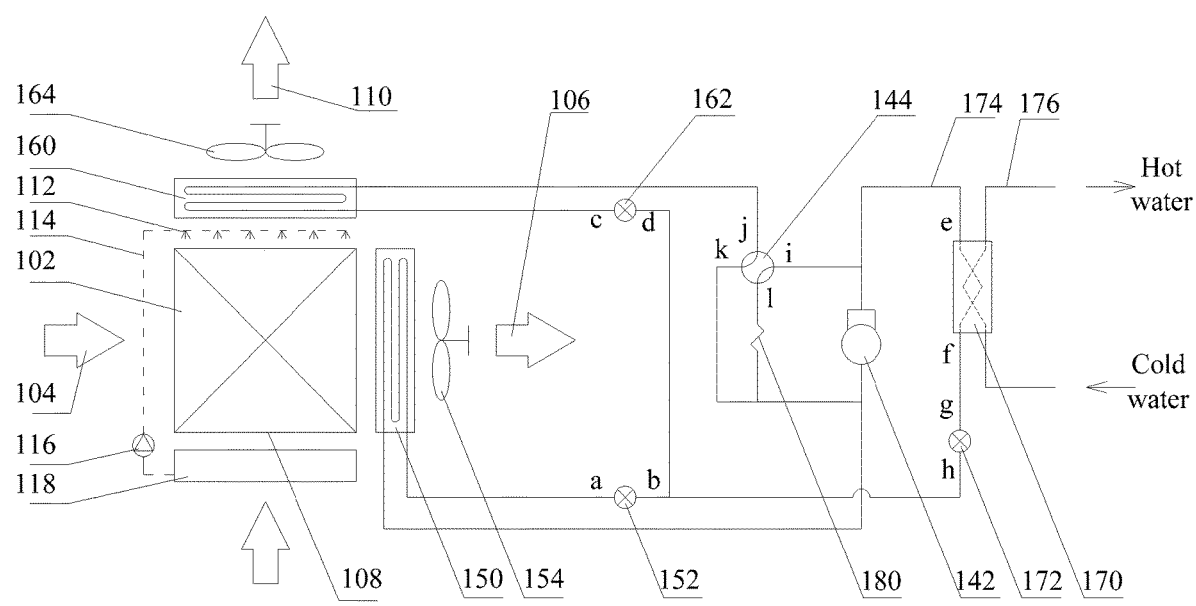
FIG. 3 is a schematic view of the working principle of a temperature adjusting device according to some embodiments of the present disclosure.

As shown in FIG. 3, in any one of the above embodiments, the compressor device 140 further includes a third throttling component 172. The second end h of the third throttling component 172 is connected to the second end b of the first throttling component 152, the second end h of the third throttling component 172 is further connected to the second end d of the second throttling component 162, and the first end g of the third throttling component 172 is connected to the second end f of the third heat exchanger 170.

In the embodiment, the refrigerant flowing out of the third heat exchanger 170 is firstly depressurized through the third throttling component 172, and then flows towards the first throttling component 152 and the second throttling component 162 for a second depressurization, and this helps improve the depressurization effect.

In some other embodiments, the third throttling component 172 is closed completely, the second port j and the third port k of the reversing valve 144 are connected, and then the compression system is only in charge of cooling the indoor air supply, while does not provide waste heat to the outside anymore. Then, the operation mode of the system is close to a conventional indirect evaporative cooling unit.

Furthermore, the opening of the third throttling component 172 can further be adjusted. Thus, through the comprehensive adjustment and control to the first throttling component 152, the second throttling component 162, the third throttling component 172 and the compressor 142, more accurate control over the temperature of the heat exchange medium can be achieved.

In some embodiments, the opening of the third throttling component 172 is controlled manually. Or, the third throttling component 172 is electrically connected to the controller, to help control the opening of the third throttling component 172 through the controller and improve the convenience of the operation of the device.

In any one of the above embodiments, the compressor device 140 further includes a first draught fan 154 and/or a second draught fan 164. The first draught fan 154 is provided at one side of the first heat exchanger 150 near the indoor air supply port 106. The first draught fan 154 is for driving the indoor air to flow. The second draught fan 164 is provided at one side of the second heat exchanger 160 near the outdoor air outlet 110. The second draught fan 164 is for driving the outdoor air to flow.

In the embodiment, through disposing the first draught fan 154 to drive the indoor air, the flowing of the indoor air can be accelerated, and the heat exchanging efficiency of the first heat exchanger 150 is improved. The flowing of the outdoor air can be accelerated and the heat exchanging efficiency of the second heat exchanger 160 can be improved through the arrangement of the second draught fan 164.

In some embodiments, the controller is further electrically connected to the first draught fan 154 and/or the second draught fan 164. Through adjusting the rotational speed of the first draught fan 154 and the second draught fan 164, the heat exchanging efficiency of the first heat exchanger 150 and the second heat exchanger 160 is adjustable, and thus the heat exchanging temperature of the heat exchange medium can further be adjusted in a degree, and the manner and the method for controlling the temperature of the heat exchange medium are added, and this helps accurately control the temperature of the heat exchange medium.

In any one of the above embodiments, the reversing valve 144 further includes a fourth port l. The compressor device 140 further includes a capillary 180. One end of the capillary 180 is connected to the refrigerant suction port of the compressor 142, and the other end of the capillary 180 is connected to the fourth port l.

In the embodiment, the other end of the capillary 180 is connected to the fourth port of the reversing valve 144, and the refrigerant suction port and the refrigerant discharge port of the compressor 142 are connected through the capillary 180 as long as the first port i is connected to the fourth port l. Thus, after the refrigerant is discharged from the compressor 142, most of the refrigerant can flow towards the third heat exchanger 170, and the remaining small portion can further directly flow back to the refrigerant suction port of the compressor 142 through the first port i and the fourth port l. Thus, when the second port j is connected to the third port k, the refrigerant can further flow through the first port, and this helps continuously maintain the circulation of the refrigerant at the first port i and the fourth port l and avoids system failure caused by oil accumulation and liquid accumulation in the return circuit.

Figure 4:
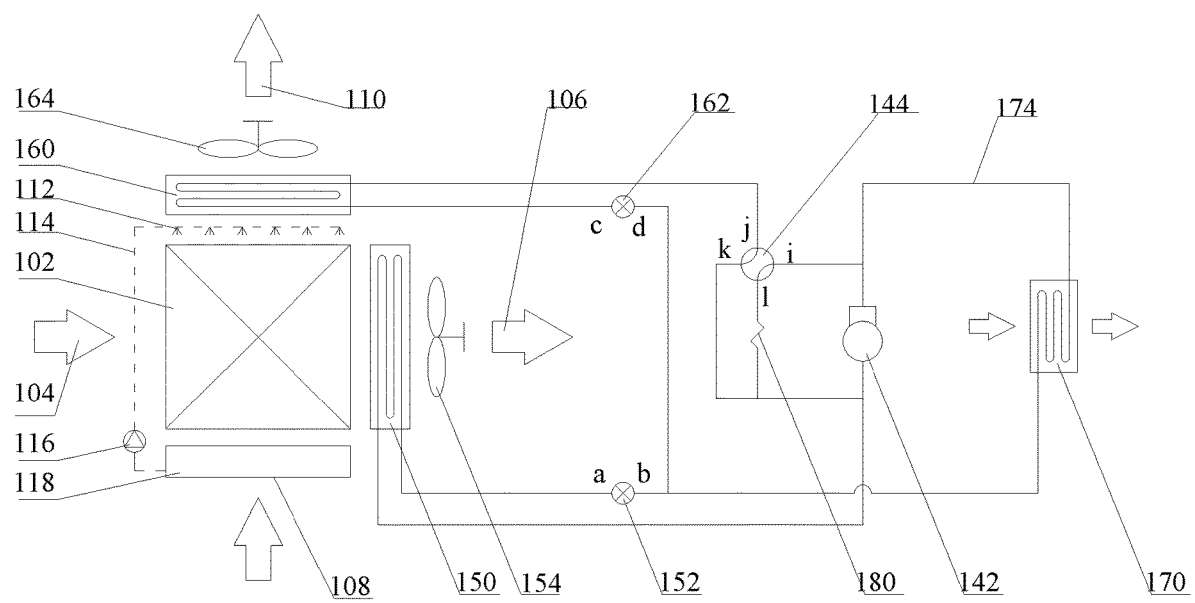
FIG. 4 is a schematic view of the working principle of a temperature adjusting device according to some embodiments of the present disclosure.

It can be understood that in any one of the above embodiments, the third heat exchanger 170 includes a refrigerant pipeline 174, and the refrigerant pipeline 174 is used as the flow path for the refrigerant. As shown in FIG. 1 to FIG. 3, the third heat exchanger 170 can further include a flow path for the heat exchange medium, for example, a water path 176. Or an air path, as shown in FIG. 4, the heat exchange medium can be the air, the third heat exchanger 170 only has a refrigerant pipeline, the air directly exchanges heat with the refrigerant pipeline, instead of exchanging heat through the pipeline. When the flow path for the heat exchange medium is the water path 176, the water in the water path 176 exchanges heat with the refrigerant in the refrigerant pipeline 174, and the device supplies hot water to users. When the heat exchange medium is the air, the air exchanges heat with the refrigerant in the refrigerant pipeline 174, and the device supplies heat to users.

In some other embodiments, the third heat exchanger 170 can further be provided with both the water path 176 and the air path at the same time, the water and the air exchange heat with the heat exchange medium at the same time, and thus, the device can not only provide hot water to users, but further provide heat to users, which provide more convenience for the use of the device.

In any one of the above embodiments, the heat exchange core 102 includes a first flow channel and a second flow channel. The first flow channel includes an indoor return air inlet 104 and an indoor air supply port 106 which are connected to each other, and is used as the flow channel of the indoor air. The second flow channel includes an outdoor air inlet 108 and an outdoor air outlet 110 which are connected to each other, and is used as the flow channel of the outdoor air.

The first flow channel and the second flow channel are disposed independent of each other in the heat exchange core 102, the indoor air flows in the first flow channel, the outdoor air flows in the second flow channel, and thus the indoor air only has heat exchange with the outdoor air, and there is not any other exchange. For some places with special indoor environment requirements, by adopting such a method, the indoor air can always maintain original properties except the temperature. For example, for some indoor spaces with high cleanliness requirements, the indoor air and the outdoor air only exchange heat, and thus the substances such as impurities and dusts in the outdoor air will not enter the indoor space and then will not affect the indoor cleanliness. Or, for some indoor environments which require maintaining temperature and humidity, the indoor air and the outdoor air only exchanges heat, the moisture in the outdoor air will not enter the indoor space, the moisture in the indoor air further will not flow away to the outside, and thus the stability of the humidity of the indoor air can be maintained. The first flow channel includes the indoor return air inlet 104 and the indoor air supply port 106 which are connected to each other, and thus the indoor air heated by the heat source can enter the first flow channel through the indoor return air inlet 104 and exchange heat with the outdoor air in the second flow channel to lower temperature, and then return to the interior through the indoor air supply port 106, to provide an environment with a relatively low temperature for the heat source and achieving the purpose of cooling and dissipating heat. Since the first heat exchanger 150 is provided at the indoor air supply port 106, the indoor air discharged from the indoor air supply port 106 can further exchange heat with the first heat exchanger 150, then the temperature is further reduced, and a portion of the waste heat is transmitted to the refrigerant in the first heat exchanger 150 and then taken away, to achieve the recovery of the waste heat. The second flow channel includes the outdoor air inlet 108 and the outdoor air outlet 110 which are connected to each other, thus the outdoor cold air can enter through the outdoor air inlet 108 and is discharged out of the outdoor air outlet 110 after it exchanges heat with the indoor air in the first flow channel and the temperature rises, and then it exchanges heat with the second heat exchanger 160 provided at the outdoor air outlet 110, a portion of the heat is transmitted to the refrigerant in the second heat exchanger 160, and the waste heat recovery is achieved.

It needs to be especially indicated that the second heat exchanger 160 has different functions in different operation modes. In the mode of completely natural cooling plus waste heat recovery (the first operation mode) and in a mode of evaporative compression refrigeration plus waste heat recovery (a third operation mode), the second heat exchanger 160 plays the role of recovering the waste heat; and in a mode of evaporative compression refrigeration plus partial waste heat recovery (a fourth operation mode), the second heat exchanger 160 plays the role of releasing the waste heat towards the external environment (the total dissipated heat of the heat source minus the heat to the heat user).

In the above embodiment, the evaporative cooling device 100 further includes a spraying nozzle 112, a water collection pan 118, a water pipe 114 and a water pump 116. The spraying nozzle 112 is for spraying water into the second flow channel. The spraying nozzle 112 is disposed on the top of the heat exchange core 102 and the sprayed water current flows naturally under the action of gravity, and thus fully exchanges heat with the outdoor air in the second flow channel. The water collection pan 118 is provided on the bottom of the heat exchange core 102 to collect the water current flowing from the second flow channel and achieve recycling the water. The water pipe 114 is connected between the water collection pan 118 and the spraying nozzle 112, and the water pump 116 is provided on the water pipe 114 to help draw water from the water collection pan 118. The number of the spraying nozzle 112 can be one or multiple.

In some embodiments, the spraying nozzle 112 is directly opened in the water pipe 114, that is, a portion of the water pipe 114 is provided on the top of the heat exchange core 102. The portion of the water pipe 114 which is located on the top of the heat exchange core 102 is opened with at least one spraying nozzle 112.

In other embodiments, the spraying nozzle 112 is provided in the bottom of the heat exchange core 102, and then the spraying nozzle 112 sprays upwards, very small water mist is sprayed out and can further be brought by wind into the heat exchange core 102.

It can be understood that the water current sprayed into the second flow channel can be evaporated using the heat absorbed during the heat exchange, to improve the cooling effect to the indoor return air. It should be indicated that the temperature of the outdoor air is very low, when the temperature of the indoor air can be greatly and sufficiently reduced without requiring the evaporation of the water current for cooling, spraying the water may not be performed to save water resources and reduce the energy consumption required by the circulation of the water flow. In addition, when the outdoor temperature is below zero degree, spraying water is further unnecessary to prevent the system failure caused by freezing.

Figure 6:
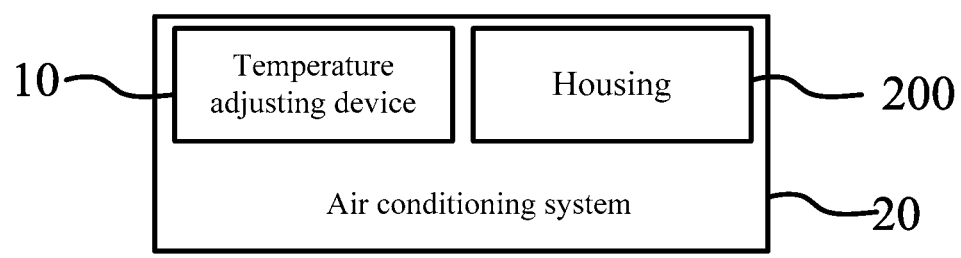
FIG. 6 is a schematic block diagram of the structure of an air conditioning system according to some embodiments of the present disclosure.

As shown in FIG. 6, the second aspect of the present disclosure proposes an air conditioning system 20, which includes the temperature adjusting device 10 of any one of the embodiments in the above first aspect.

In the embodiment, by adopting the temperature adjusting device 10 of any one of the embodiments in the above first aspect, it has all the beneficial effects of the above first aspect, which will not be repeated herein.

Furthermore, the air conditioning system 20 further includes a housing 200, and the compressor 142 of the temperature adjusting device 10 is provided in the housing 200.

In the embodiment, the compressor 142 is provided in the housing 200 to form a protection for the compressor 142 through the housing 200 and prevent damaging the compressor 142. In addition, the arrangement of the housing 200 can reduce the working noise of the compressor 142 and the transmission of the generated heat towards the outside.

Figure 8:
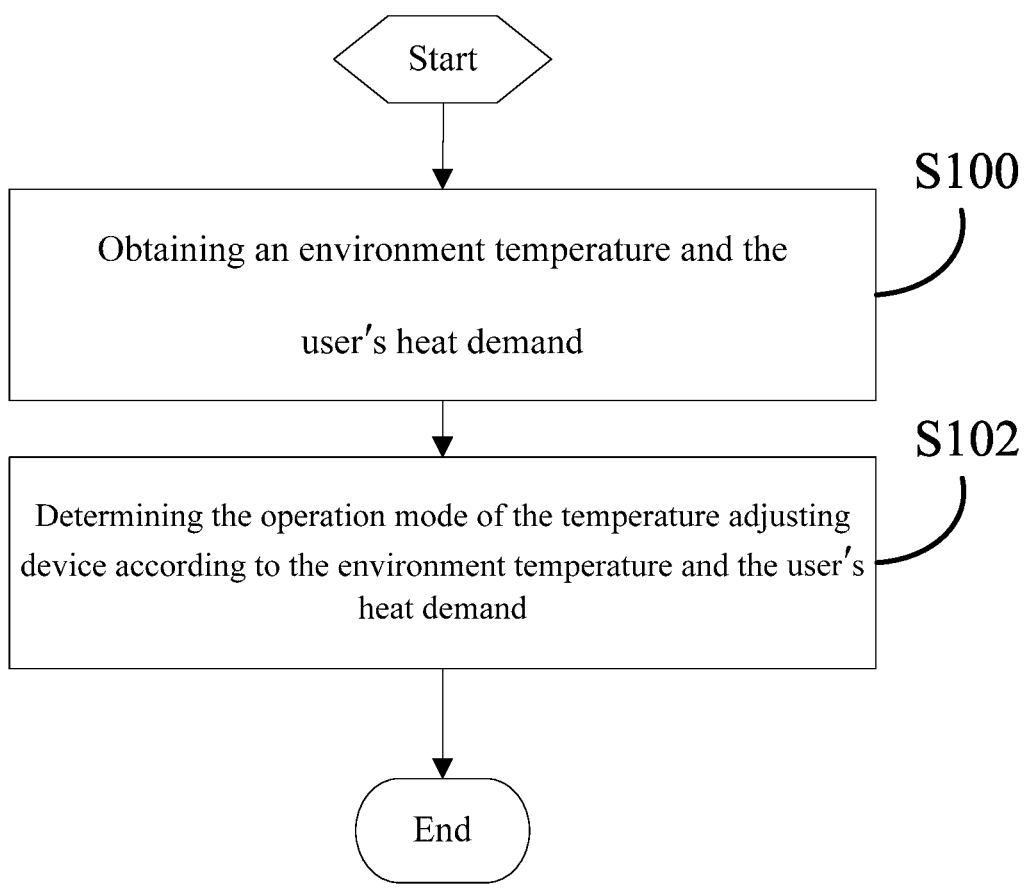
FIG. 8 is a schematic view of the working flow of a control method according to some embodiments of the present disclosure.

As shown in FIG. 8, the third aspect of the present disclosure proposes a control method, which is used for the temperature adjusting device of any one of the embodiments of the above first aspect, and includes:

step S100: obtaining an environment temperature and the user's heat demand; and step S102: determining the operation mode of the temperature adjusting device according to the environment temperature and the user's heat demand.

In the embodiment, the operation mode of the temperature adjusting device is determined according to the environment temperature and the user's heat demand, and this helps adopt different operation modes in different environment temperature conditions, and thus improve the flexibility of the operating of the temperature adjusting device.

In the above embodiment, the operation mode includes a first operation mode, a second operation mode, a third operation mode and a fourth operation mode.

In the first operation mode, the temperature adjusting device performs evaporative cooling on a heat source and performs waste heat recovery, i.e., the above mentioned mode of completely natural cooling plus waste heat recovery.

In the second operation mode, the temperature adjusting device performs evaporative cooling on a heat source and recovers a portion of the waste heat.

In the third operation mode, the temperature adjusting device performs evaporative cooling and compression refrigeration on a heat source and performs waste heat recovery, i.e., the above mentioned mode of evaporative compression refrigeration plus waste heat recovery.

In the fourth operation mode, the temperature adjusting device performs evaporative cooling and compression refrigeration on a heat source and recovers a portion of the waste heat, i.e., the above mentioned mode of evaporative compression refrigeration plus partial waste heat recovery.

Figure 9:
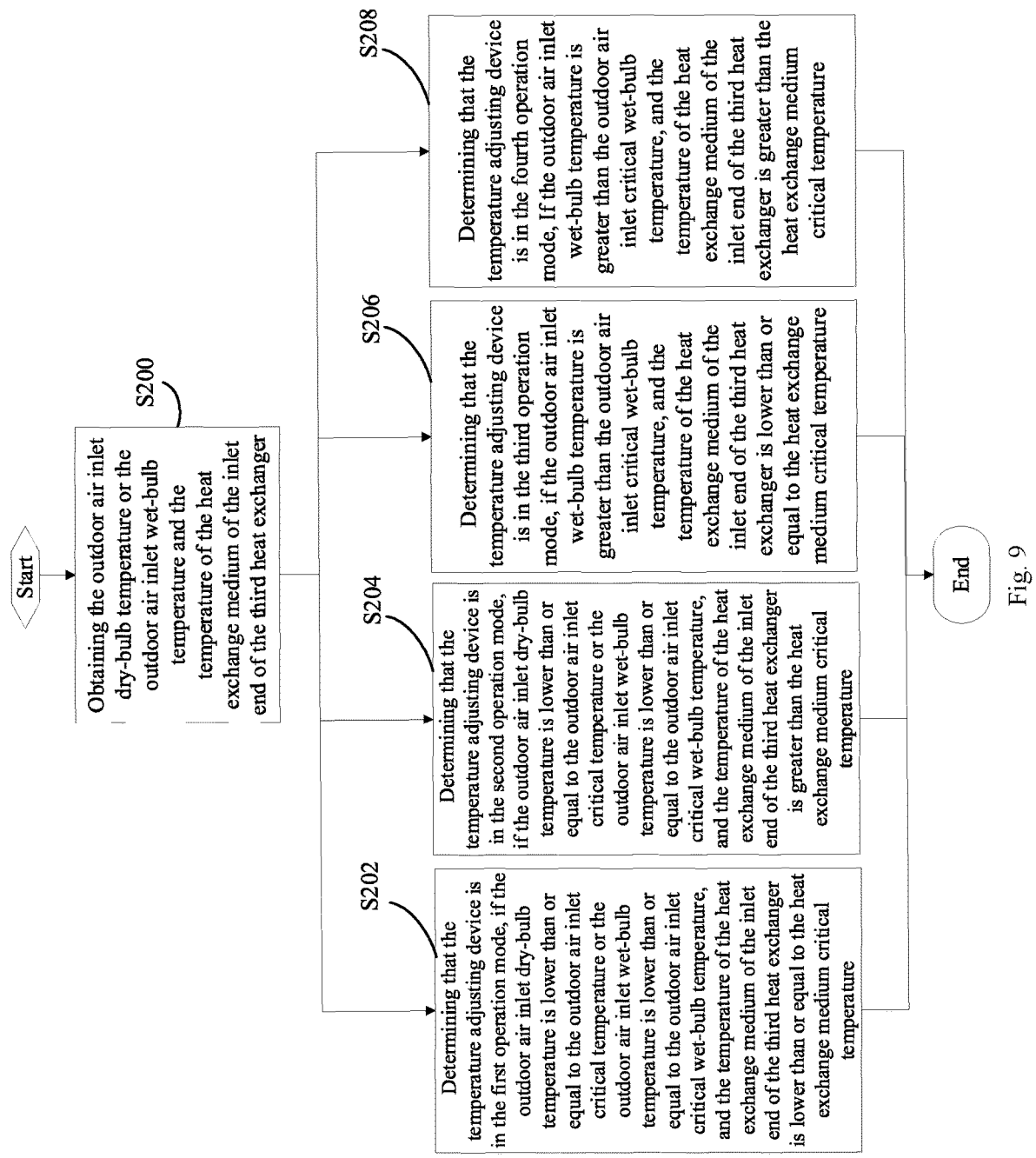
FIG. 9 is a schematic view of the working flow of a control method according to some embodiments of the present disclosure.

As shown in FIG. 9, in some embodiments, the environment temperature includes the outdoor air inlet dry-bulb temperature and the outdoor air inlet wet-bulb temperature. The user's heat demand is determined according to the size relationship between the temperature of the heat exchange medium of the inlet end of the third heat exchanger and the heat exchange medium critical temperature. When the heat exchange medium is water, the temperature of the heat exchange medium of the inlet end of the third heat exchanger is the return water temperature. When the heat exchange medium is air, the temperature is the temperature of the return air. The lower the temperature of the return water or return air is, the larger the user's heat demand is. Therefore, a heat exchange medium critical temperature can be set to measure the user's heat demand; when the temperature of the heat exchange medium of the inlet end of the third heat exchanger is greater than the heat exchange medium critical temperature, it is determined that the user's heat demand is small; when the temperature of the heat exchange medium of the inlet end of the third heat exchanger is lower than or equal to the heat exchange medium critical temperature, it is determined that the user's heat demand is large. The control method includes:

step S200: obtaining the outdoor air inlet dry-bulb temperature or the outdoor air inlet wet-bulb temperature and the temperature of the heat exchange medium of the inlet end of the third heat exchanger;

step S202: determining that the temperature adjusting device is in the first operation mode, if the outdoor air inlet dry-bulb temperature is lower than or equal to the outdoor air inlet critical temperature or the outdoor air inlet wet-bulb temperature is lower than or equal to the outdoor air inlet critical wet-bulb temperature, and the temperature of the heat exchange medium of the inlet end of the third heat exchanger is lower than or equal to the heat exchange medium critical temperature;

step S204: determining that the temperature adjusting device is in the second operation mode, if the outdoor air inlet dry-bulb temperature is lower than or equal to the outdoor air inlet critical temperature or the outdoor air inlet wet-bulb temperature is lower than or equal to the outdoor air inlet critical wet-bulb temperature, and the temperature of the heat exchange medium of the inlet end of the third heat exchanger is greater than the heat exchange medium critical temperature;

step S206: determining that the temperature adjusting device is in the third operation mode, if the outdoor air inlet wet-bulb temperature is greater than the outdoor air inlet critical wet-bulb temperature, and the temperature of the heat exchange medium of the inlet end of the third heat exchanger is lower than or equal to the heat exchange medium critical temperature; and step S208: determining that the temperature adjusting device is in the fourth operation mode, if the outdoor air inlet wet-bulb temperature is greater than the outdoor air inlet critical wet-bulb temperature, and the temperature of the heat exchange medium of the inlet end of the third heat exchanger is greater than the heat exchange medium critical temperature.

In the embodiment, when the outdoor air inlet dry-bulb temperature is lower than or equal to the outdoor air inlet critical dry-bulb temperature, or the outdoor air inlet wet-bulb temperature is lower than or equal to the outdoor air inlet critical wet-bulb temperature, it is determined that the outdoor temperature is relatively low at the moment, the cooling capacity in the outdoor environment can be for achieving the purpose of cooling and heat dissipation for the heat source, and therefore, the completely natural cooling method is adopted to perform cooling and heat dissipation. The temperature of the heat exchange medium of the inlet end of the third heat exchanger is lower than or equal to the heat exchange medium critical temperature, and it means that the temperature of the return water or the return air is relatively low, and this is unfavorable for users' demand on heating or hot water, and thus it is determined that the users have a large demand on heat, i.e., the heat needed by users is greater than the supplied heat amount, and therefore, the heat generated from the heat source can be recovered completely. To sum up, the first operation mode is adopted, i.e., the mode of completely natural cooling plus waste heat recovery, that is, heat exchange is performed completely using the outdoor air and the indoor air, while the compressor device is mainly used for the waste heat recovery.

In some embodiments, in the first operation mode, the first throttling component is closed, the second throttling component is opened, and the second port j and the third port k of the reversing valve are connected, and the refrigerant suction port of the compressor is connected to the second heat exchanger. In the mode, after discharged from the refrigerant discharge port of the compressor, the refrigerant of high temperature and high pressure generated during the working of the compressor flows into the third heat exchanger to exchange heat with the heat exchange medium. When the heat exchange medium is water, hot water can be supplied to users through heat exchange. When the heat exchange medium is air, heat can be directly supplied to users through the heat exchange. After the refrigerant exchanges heat with the heat exchange medium, the temperature is lowered, and it can only flow towards the second throttling component since the first throttling component is closed. After depressurized through the second throttling component, the refrigerant becomes a liquid of low temperature and low pressure and enters the second heat exchanger. Since the second heat exchanger is provided at the outdoor air outlet, at this moment, the air discharged out of the outdoor air outlet has exchanged heat with the indoor hot air, the temperature rises, and thus, when the outdoor air subjected to heat exchange is discharged from the outdoor air outlet, the outdoor air exchanges heat with the refrigerant liquid with a lowered temperature in the second heat exchanger, then the waste heat of the heat source sucked from the indoor hot air is transmitted to the refrigerant in the second heat exchanger, and thus the temperature of the refrigerant rises. After the refrigerant in the second heat exchanger exchanges heat and then its temperature rises, the refrigerant flows towards the reversing valve. The second port j and the third port k of the reversing valve are connected, and the refrigerant flows to the refrigerant suction port of the compressor through the second port j and the third port k, and thus the waste heat is brought back to the compressor. In the next circulation, the waste heat is brought to the third heat exchanger again by the refrigerant of high temperature and high pressure discharged from the compressor, to achieve the recovery and use of the waste heat.

In the above process, taking a data center for example, the data center is the heat source, performing cooling and heat dissipation for the heat source is achieved completely by the exchange between the outdoor cold air and the indoor hot air, and the heat is brought to the outdoor air through the indoor air, then the outdoor air further transmits the heat to the refrigerant, and the refrigerant transmits the heat to the heat exchange medium through the compressor and the third heat exchanger, to achieve the heat recovery. Such a temperature adjusting device can not only achieve cooling and heat dissipation for the heat source, but further recover and use the waste heat generated by the heat source, and a small number of components are added, the space occupied is small, and the waste heat of the heat source can be fully used in a precondition of meeting the needs of the indoor air supply temperature and the cooling capacity, and this helps save energy and reduce consumption.

It needs to be indicated that the mode of completely natural cooling plus waste heat recovery is achieved by the method of closing the first throttling component and opening the second throttling component.

If the outdoor air inlet dry-bulb temperature is lower than or equal to the outdoor air inlet critical dry-bulb temperature, or the outdoor air inlet wet-bulb temperature is lower than or equal to the outdoor air inlet wet-bulb critical temperature, it means that the outdoor temperature is relatively low, the cooling capacity is sufficient for cooling and heat dissipation for the indoor heat source, and thus, only the natural cooling mode can be adopted. If the temperature of the heat exchange medium of the inlet end of the third heat exchanger, i.e., the temperature of the return water or the return air, is greater than the heat exchange medium critical temperature at the moment, it is determined that the user's heat demand is small, the heat amount needed by users is smaller than the supplied heat amount, and therefore, it is only necessary to recover a portion of the waste heat, it is determined that the temperature adjusting device is in the second operation mode, that is, a mode in which natural cooling is adopted while a portion of the waste heat is recovered. The second operation mode is different from the first operation mode, and the opening of the second throttling component in the second operation mode is smaller than that in the first operation mode. Or, the frequency of the compressor in the second operation mode is smaller than that of the compressor in the first operation mode.

If the outdoor air inlet temperature is greater than the outdoor air inlet critical temperature, for example, the outdoor air inlet wet-bulb temperature is greater than the outdoor air inlet wet-bulb critical temperature, it means that the outdoor temperature is relatively high at the moment, and this is not sufficient to fully achieving cooling and heat dissipation for the heat source, and thus the method of natural cooling plus compression cooling can be adopted to cool the heat source, that is, the evaporative compression refrigeration is adopted. If the user's heat demand is large, or the temperature of the heat exchange medium in the inlet end of the third heat exchanger is lower than or equal to the heat exchange medium critical temperature, it means that the temperature of the return water or return air is relatively low, more heat needs to be supplemented, and thus all the heat generated by the heat source is recovered, and therefore, it is determined that in the above case, the temperature adjusting device is in the third operation mode, i.e., the mode of evaporative compression refrigeration plus waste heat recovery.

In the third operation mode, the mode can be operated by adopting the method of closing the second throttling component and opening the first throttling component. In some embodiments, the second throttling component is closed, the first throttling component is opened, and the second port j and the third port k of the reversing valve are disconnected. After the refrigerant flows out of the refrigerant discharge port of the compressor, it firstly enters the third heat exchanger to exchange heat with the heat exchange medium to lower temperature, then the temperature of the heat exchange medium rises. Then the refrigerant flows towards the first throttling component, and then flows into the first heat exchanger to exchange heat with the indoor air supply and take the waste heat of the indoor heat source, and finally flows back to the compressor.

Or, another method is adopted: the second port j and the third port k of the reversing valve are connected. Both the first throttling component and the second throttling component are opened. After discharged from the refrigerant discharge port of the compressor, the refrigerant flows towards the third heat exchanger, and exchanges heat with the heat exchange medium in the third heat exchanger, to provide heat to users through the heat exchange medium. After the heat exchange is accomplished in the third heat exchanger, the refrigerant is divided into two paths and flows. One path flows towards the first throttling component, and exchanges heat with the indoor air supply through the first heat exchanger and then its temperature rises, and then this path flows back to the compressor while takes the waste heat transmitted by the indoor air supply. The other path flows towards the second throttling component, and exchanges heat with the outdoor air discharge through the second heat exchanger and then its temperature rises, and then this path flows back to the compressor through the second port j and the third port k of the reversing valve, thus the waste heat transmitted by the outdoor air discharge is brought to the compressor, and after the compression of the compressor, the waste heat brought by the two paths of refrigerant is transmitted to the heat exchange medium at the third heat exchanger in the next circulation. The first heat exchanger and the second heat exchanger respectively recover the waste heat from the indoor air supply and the outdoor air discharge. Thus, as the heat exchange amount of the first heat exchanger is not sufficient to meet the needs of users, the waste heat is recovered from both the first heat exchanger and the second heat exchanger at the same time, to recover more waste heat, improving the waste heat recovery rate, and meeting the user's heat demand as much as possible.

If the outdoor air inlet wet-bulb temperature is greater than the outdoor air inlet critical wet-bulb temperature and the temperature of the heat exchange medium of the inlet end of the third heat exchanger is greater than the heat exchange medium critical temperature, that is, the user's heat demand is small, it is unnecessary to recover too much waste heat. Therefore, in this case, the fourth operation mode is adopted, i.e., the mode of evaporative compression refrigeration plus partial waste heat recovery, and at the moment, the natural cooling is combined with the compression refrigeration, and a portion of the waste heat is recovered, and it is unnecessary to recover all the waste heat. In some embodiments, in the mode of evaporative compression refrigeration plus partial waste heat recovery, the compressor is opened to supplement refrigeration, a portion of the waste heat is recovered, and the excess heat is discharged to the outdoor environment through the outdoor air outlet. The first port and the second port j of the reversing valve are connected, the second port j and the third port k are disconnected. After the refrigerant flows out of the refrigerant discharge port of the compressor, one path still flows towards the third heat exchanger, the temperature is reduced after it exchanges heat with the heat exchange medium, then the path for refrigerant flows towards the first throttling component, and flows towards the first heat exchanger after depressurized through the first throttling component, and exchanges heat with the indoor air discharged from the indoor air supply port at the first heat exchanger, takes a portion of the waste heat of the heat source, and then returns to the refrigerant suction port of the compressor. After the refrigerant flows out of the refrigerant discharge port of the compressor, the other path for the refrigerant flows towards the second heat exchanger through the first port and the second port j of the reversing valve, and exchanges heat with the air discharged out of the outdoor air outlet at the second heat exchanger, takes a portion of the waste heat, and is depressurized through the second throttling component, then flows towards the first throttling component, and after depressurized once again together with the refrigerant previously flowing out of the refrigerant discharge port of the compressor, the refrigerant flows towards the first heat exchanger for heat exchange and then flows back to the compressor.

In some embodiments, if the outdoor air inlet temperature is greater than the outdoor air inlet critical temperature, and the indoor air supply temperature is lower than or equal to the indoor air supply critical temperature, it means that the outdoor temperature is relatively high at the moment, but the cooling needs of the indoor heat source still can be met, and therefore, the natural cooling method can be adopted continuously, and the compression refrigeration is not needed; if the user's heat demand is great, it is determined that the temperature adjusting device is in the first operation mode. Correspondingly, if the user's heat demand is small, it is determined that the temperature adjusting device is in the second operation mode.

It needs to be explained that in some cases, the outdoor air inlet dry-bulb temperature is lower than or equal to the outdoor air inlet critical dry-bulb temperature, but the indoor air supply temperature may be greater than the indoor air supply critical temperature, this means that there are some reasons at the moment, for example, the heat exchange core is dirty, blocked, or has scale formation, etc., and such reasons render that the indoor air supply temperature still do not meet the requirement although the outdoor air temperature is relatively low. At this moment, the compressor device should be opened to supplement refrigeration. If the user's heat demand is large at the moment, it is determined that the temperature adjusting device is in the third operation mode, i.e., evaporative cooling and compression refrigeration are performed at the same time, and the waste heat is recovered. If the user's heat demand is small, it is determined that the temperature adjusting device is in the fourth operation mode, and only a portion of the waste heat is recovered.

Figure 7:
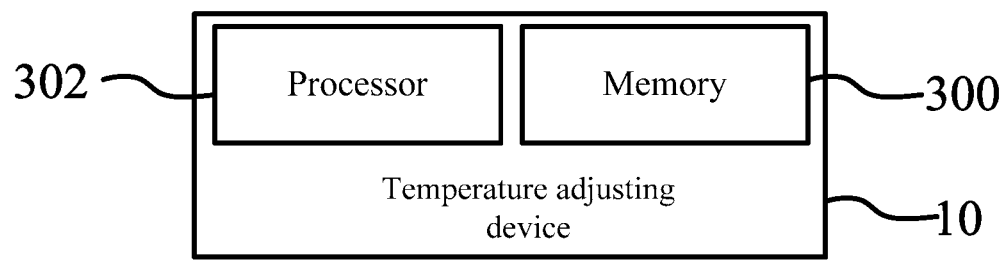
FIG. 7 is a schematic block diagram of the structure of a temperature adjusting device according to some embodiments of the present disclosure.

As shown in FIG. 7, the embodiments according to the fourth aspect of the present disclosure propose a temperature adjusting device 10, including: a memory 300 and a processor 302, and, the memory 300 stores a computer program that can be executed on the processor 302, and the steps of the control method according to any one of the embodiments in the above third aspect are implemented when the processor 302 executes the computer program, and thus, the temperature adjusting device 10 has the beneficial effects of any one of the above embodiments, which will not be repeated herein.

The embodiments according to the fifth aspect of the present disclosure propose a readable storage medium, in which a computer program is stored, and the steps of the control method according to any one of the embodiments in the above third aspect are achieved when the processor 302 executes the computer program, and thus, the readable storage medium has the beneficial effects of any one of the above embodiments, which will not be repeated herein.

The temperature adjusting device 10 (i.e., an indirect evaporative cooling and waste heat recovering device) according to a specific embodiment proposed in the present disclosure is used for a data computer room which heat source is the data center. The temperature adjusting device 10 includes an evaporative cooling device 100 and a compressor device.

The evaporative cooling device 100 includes a heat exchange core 102, a spraying nozzle 112, a spraying water pipe 114, a spraying water pump 116 and a water collection pan 118. The heat exchange core 102 includes two sets of flow channels, i.e., a first flow channel and a second flow channel.

Cold and hot fluids respectively flow through the two sets of flow channels of the heat exchange core 102 and produce heat exchange. When the evaporative cooling device 100 works, the outdoor air with a relatively low outdoor temperature or humidity enters the second flow channel of the heat exchange core 102, and the indoor air enters the first flow channel of the heat exchange core 102. The spraying water pump 116 draws water from the water collection pan 118 and conveys the water to the spraying nozzle 112 through the spraying water pipe 114, then the spraying water is sprayed uniformly to the inside of the heat exchange core 102, and evaporated in the second flow channel where the outdoor air is located to improve the cooling effect to the indoor return air. If the outdoor temperature is very low, for the consideration of saving water resources or preventing freezing, the spraying water pump 116 stops operating, and the outdoor air exchanges heat with the indoor return air in a dry working condition inside the heat exchange core 102.

The evaporative compression device includes a compressor 142, a first heat exchanger 150, a first draught fan 154, a first throttling component 152, a second heat exchanger 160, a second draught fan 164, a second throttling component 162, a reversing valve 144, a capillary 180 and a third heat exchanger 170.

The temperature adjusting device 10 includes at least three operation modes, which are respectively the mode of completely natural cooling plus waste heat recovery, the mode of evaporative compression refrigeration plus waste heat recovery, and the mode of evaporative compression refrigeration plus partial waste heat recovery. When (To≤To1 or Tow≤To2), the mode of completely natural cooling plus waste heat recovery is operated; when Tow>To2 and $T_h$≤To3, the mode of evaporative compression refrigeration plus waste heat recovery is operated; and when Tow>To2 and $T_h$>To3, the mode of evaporative compression refrigeration plus partial waste heat recovery is operated. And the outdoor air inlet dry-bulb temperature is To, the outdoor air inlet wet-bulb temperature is Tow, the outdoor air inlet critical dry-bulb temperature is To1 (To1>0), the outdoor air inlet critical wet-bulb temperature is To2 (To2>0 and To2>To1), the temperature of the heat exchange medium of the inlet end of the third heat exchanger is $T_h$, and the heat exchange medium critical temperature is To3. The indoor air inlet temperature, i.e., a data computer room air supply temperature, is Tis, and a data computer room air supply setting temperature is Tiset. The maximum heating capacity of the device is Qh, the real-time heat exchange amount of the first heat exchanger 150 is Qh2, and the user's real-time heat demand is Qo.

The beneficial effects of the present specific embodiment: the temperature adjusting device 10 of the present specific embodiment fully uses the compressor 142, two heat exchangers (the first heat exchanger 150 and the second heat exchanger 160) and the first throttling component 152 (for example, an electronic expansion valve) of the evaporative compression refrigerating system of the original indirect evaporative cooling unit, fine waste heat recovering effect can be achieved by only adding a few additional components (the reversing valve 144, the second throttling component 162, the capillary 180, etc.) and adjusting a little refrigerant pipeline 174; and the temperature adjusting device 10 (the indirect evaporative cooling and waste heat recovering device) has a simpler structure, occupies small space, and has low device cost, achieves more accurate control over the temperature of the waste heat, and can recover the waste heat discharged from the data computer room as much as possible in a precondition of meeting the needs of the air supply temperature and the cooling capacity of the data computer room.

Figure 5:
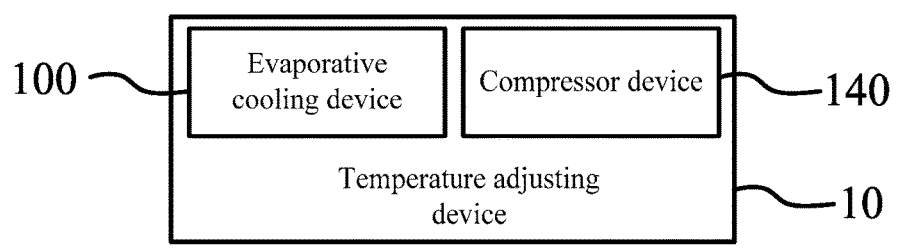
FIG. 5 is a schematic block diagram of the structure of a temperature adjusting device according to some embodiments of the present disclosure.

As shown in FIG. 5, the temperature adjusting device 10 proposed in the specific embodiment according to the present disclosure includes an evaporative cooling device 100 and an evaporative compressor device 140.

The evaporative cooling device 100 includes a heat exchange core 102, a spraying nozzle 112, a spraying water pipe 114, a spraying water pump 116 and a water collection pan 118. The heat exchange core 102 includes a first flow channel and a second flow channel. Cold and hot fluids respectively flow through the two sets of flow channels of the heat exchange core 102 and produce heat exchange. When the evaporative cooling device 100 works, the outdoor air with a relatively low temperature or humidity enters the second flow channel of the heat exchange core 102, and the indoor air enters the first flow channel of the heat exchange core 102. The spraying water pump 116 draws water from the water collection pan 118 and conveys the water to the spraying nozzle 112 through the spraying water pipe 114, then the spraying water is sprayed uniformly to the inside of the heat exchange core 102, and evaporated in the flow channel of the outdoor air to improve the cooling effect to the indoor return air. If the outdoor temperature is very low, for the consideration of saving water resources or preventing freezing, the spraying water pump 116 stops operating, and the outdoor air exchanges heat with the indoor return air in a dry working condition inside the heat exchange core 102.

The evaporative compressor device includes a compressor 142, a first heat exchanger 150, a first draught fan 154, a first throttling component 152, a second heat exchanger 160, a second draught fan 164, a second throttling component 162, a reversing valve 144, a capillary 180 and a third heat exchanger 170.

The indirect evaporative cooling and waste heat recovering device includes at least three operation modes, which are respectively as follows (suppose that the outdoor air inlet dry-bulb temperature is To, the outdoor air inlet wet-bulb temperature is Tow, the outdoor air inlet critical dry-bulb temperature is To1 (To1>0), the outdoor air inlet critical wet-bulb temperature is To2 (To2>0 and To2>To1), the maximum heating capacity of the device is Qh, the real-time heat exchange amount of the first heat exchanger 150 is Qh2, and the user's real-time heat demand is Qo):

(1) the mode of completely natural cooling plus waste heat recovery:

when (To≤To1 or Tow≤To2), it is a completely natural cooling state at the moment, the compressor 142 is not for cooling the indoor air supply, and a compression refrigerating/heating device works in a waste heat recovering state. In the mode, the reversing valve 144 is opened, the second throttling component 162 is opened, the first throttling component 152 is closed completely, most of the refrigerant of high temperature and high pressure discharged from the compressor 142 enters the third heat exchanger 170, and the cold water from heat users is heated into hot water. After flowing out of the third heat exchanger 170, the refrigerant successively goes through the second throttling component 162 and the second heat exchanger 160, and the refrigerant subjected to throttling and depressurizing absorbs the outdoor air outlet waste heat in the second heat exchanger 160, and then goes through the reversing valve 144 and returns to the compressor 142, and thus the integral waste heat recovering circulation is accomplished. Through the frequency conversion adjustment to the compressor 142 and the opening adjustment to the second throttling component 162, the accurate control over the hot water outlet temperature of the third heat exchanger 170 can be achieved.

In addition, a little refrigerant enters the capillary 180 through the reversing valve 144 from the refrigerant discharge port of the compressor 142, and this mainly plays the role of making the return circuit always maintain refrigerant circulation, and preventing system failure caused by oil accumulation and fluid accumulation in the return circuit.

The judgment of the relationship between the user's heat demand, or the user's real-time heat demand Qo and the maximum heating capacity of the device is determined by the relation between the temperature of the heat exchange medium of the inlet end of the third heat exchanger and the heat exchange medium critical temperature. The temperature $T_h$ of the heat exchange medium of the inlet end of the third heat exchanger is lower than or equal to the heat exchange medium temperature To3, i.e., $T_h \leq To3$, then the user's real-time heat demand is greater than the heating capacity, the user's heat demand is large, and thus the waste heat is recovered completely.

When $T_h > To3$, then the user's real-time heat demand is smaller than the heating capacity, the user's heat demand is small, and a portion of the waste heat is recovered.

(2) the mode of evaporative compression refrigeration plus waste heat recovery:

When Tow>To2 and $T_h \leq To3$, the compressor 142 is opened to supplement refrigeration and the return air of the data computer room flowing out of the heat exchange core 102 is cooled continuously. In the mode, the reversing valve 144 is opened, the first throttling component 152 and the second throttling component 162 are opened, and the refrigerant discharged from the compressor 142 is divided into two paths and flows as follows: (1) the compressor 142—the third heat exchanger 170—the first throttling component 152—the first heat exchanger 150—the reversing valve 144—the compressor 142; and (2) the compressor 142—the third heat exchanger 170—the second throttling component 162—the second heat exchanger 160—the compressor 142. The second heat exchanger 160 and the first heat exchanger 150 respectively recover the waste heat from the outdoor air outlet and the indoor air supply, and through adjusting the frequency conversion of the compressor 142 and adjusting the opening of the first throttling component 152 and the second throttling component 162, the control over the hot water outlet temperature of the third heat exchanger 170 can be achieved in a precondition of meeting the need of the data computer room on the indoor air supply temperature.

In addition, a little refrigerant enters the capillary 180 through the reversing valve 144 from the refrigerant discharge port of the compressor 142, and this mainly plays the role of making the return circuit always keep refrigerant circulation, and preventing system failure caused by oil accumulation and fluid accumulation in the return circuit.

In addition, in the mode, there still is another operation method: the reversing valve 144 is opened, the second throttling component 162 is closed completely, the first throttling component 152 is opened, most of the refrigerant of high temperature and high pressure discharged from the compressor 142 enters the third heat exchanger 170, and the cold water from heat users is heated into hot water. After flowing out of the third heat exchanger 170, the refrigerant successively goes through the first throttling component 152 and the first heat exchanger 150, and the refrigerant subjected to throttling and depressurizing absorbs the return air heat waste of the data computer room in the first heat exchanger 150, and then returns to the compressor 142, and thus the integral waste heat recovering circulation is accomplished. Through the adjustment to the compressor 142, the first throttling component 152 and the first draught fan 154, accurate control over the hot water outlet temperature of the third heat exchanger 170 can be achieved.

(3) the mode of evaporative compression refrigeration plus partial waste heat recovery:

when Tow>To2 and $T_h > To3$, the compressor 142 is opened to supplement refrigeration and supply heat to heat users, and the waste heat generated by the computer room is discharged to the outdoor environment. In the mode, the reversing valve 144 is closed, the first throttling component 152 is opened, and the second throttling component 162 is opened completely, and the refrigerant discharged from the compressor 142 is divided into two paths and flows as follows: (1) the compressor 142—the third heat exchanger 170—the first throttling component 152—the first heat exchanger 150—the compressor 142; and (2) the compressor 142—the reversing valve 144—the second heat exchanger 160—the second throttling component 162—the first throttling component 152—the first heat exchanger 150—the compressor 142. The first heat exchanger 150 obtains waste heat while supplies cooling to the data computer room, a portion of the waste heat is transmitted to the heat users through the third heat exchanger 170, while the other portion of the waste heat is discharge to the outdoor environment through the second heat exchanger 160. Through adjusting the frequency conversion of the compressor 142 and adjusting the opening of the first throttling component 152, the accurate control over the hot water outlet temperature of the third heat exchanger 170 can be achieved in a precondition of meeting the needs of the data computer room on the indoor air supply temperature.

As shown in FIG. 4, based on the above embodiments, the third throttling component 172 is added, and more accurate control over the heating temperature can be achieved through the comprehensive adjustment and control to the compressor 142, the first throttling component 152, the second throttling component 162 and the third throttling component 172.

As shown in FIG. 4, the above third heat exchanger 170 is changed to an air-refrigerant heat exchanger to heat room air and then supply heat to the room directly.

The embodiments proposed by the present disclosure are explained in detail in combination with the accompanying drawings, and through the above embodiments, the waste heat of the heat source is effectively recovered, and the number of the added components is small, the integral structure of the device is simple and the space occupied is small.

In the embodiments according to the present disclosure, the terms "first", "second" and "third" are used for the purpose of description only, and cannot be understood to indicate or imply relative importance, and the term of "multiple" indicates two or more, unless otherwise explicitly specified or defined. The terms "mounting", "connected to", "connection", "fixing" and the like should be understood in a broad sense, for example, the term "connection" may be a fixed connection, and may further be a removable connection, or an integral connection; and the term "connected to" may be a direct connection and may further be an indirect connection through an intermediary.

In the description of the present specification, the descriptions of the terms "one embodiment", "some embodiments" and "specific embodiments" and the like mean that specific features, structures, materials or characteristics described in combination with the embodiment(s) or example(s) are included in at least one embodiment or example of the present disclosure. In the specification, the schematic representation of the above terms does not necessarily refer to the same embodiment or example. Moreover, the features, structures, materials or characteristics described may be combined in a suitable manner in any one or more embodiments or examples.

The descriptions above are only preferred embodiments of the present disclosure, which are not for limiting the embodiments of the present disclosure. The embodiments of the present disclosure may have various changes and variations. Any modifications, equivalent substitutions, improvements and etc. made within the spirit and principle of the present disclosure shall all be included in the protection scope of the embodiments of the present disclosure.

What is claimed is:

1. A control method for a temperature adjusting device, comprising:
    obtaining an environment temperature and a heat demand of a user; and
    determining an operation mode of the temperature adjusting device based on the environment temperature and the heat demand of the user;
    wherein the operation mode comprises: a first operation mode, a second operation mode, a third operation mode and a fourth operation mode;
    in the first operation mode, the temperature adjusting device performs evaporative cooling on a heat source and recovers waste heat;
    in the second operation mode, the temperature adjusting device performs evaporative cooling on the heat source and recovers a portion of waste heat;
    in the third operation mode, the temperature adjusting device performs evaporative cooling and compression refrigeration on the heat source and recovers the waste heat; and
    in the fourth operation mode, the temperature adjusting device performs evaporative cooling and compression refrigeration on the heat source and recovers the portion of waste heat;
    wherein the temperature adjusting device comprises:
    an evaporative cooling device, comprising:
    a heat exchange core, for exchanging heat between indoor air and outdoor air, wherein the heat exchange core comprises an indoor air supply port and an outdoor air outlet; and
    a compressor device, comprising:
    a compressor, comprising an refrigerant discharge port and refrigerant suction port;
    a first heat exchanger, provided at one side of the indoor air supply port and connected to the refrigerant suction port of the compressor;
    a first throttling component with a first end connected to the first heat exchanger;
    a second heat exchanger, disposed at one side of the outdoor air outlet;
    a second throttling component with a first end connected to the second heat exchanger;
    a reversing valve, comprising a first port, a second port, and a third port, wherein the first port is connected to the refrigerant discharge port of the compressor, the second port is connected to the second heat exchanger, and the third port is connected to the refrigerant suction port of the compressor; and
    a third heat exchanger with a first end connected to the refrigerant discharge port of the compressor, a second end connected to the second end of the first throttling component, and further connected to the second end of the second throttling component, and the third heat exchanger being configured to exchange heat with a heat exchange medium.

2. The control method according to claim 1, wherein,
    the environment temperature comprises an outdoor air inlet dry-bulb temperature and an outdoor air inlet wet-bulb temperature;
    the heat demand of the user is determined based on a size relationship between the temperature of the heat exchange medium of the inlet end of the third heat exchanger and a heat exchange medium critical temperature;
    obtaining the environment temperature and the heat demand of the user specifically comprises:
    obtaining the outdoor air inlet dry-bulb temperature or the outdoor air inlet wet-bulb temperature and the temperature of the heat exchange medium of the inlet end of the third heat exchanger;
    determining the operation mode of the temperature adjusting device based on the environment temperature and the heat demand of the user specifically comprises:
    if the outdoor air inlet dry-bulb temperature is lower than or equal to an outdoor air inlet critical dry-bulb temperature or the outdoor air inlet wet-bulb temperature is lower than or equal to an outdoor air inlet critical wet-bulb temperature, and the temperature of the heat exchange medium of the inlet end of the third heat exchanger is lower than or equal to the heat exchange medium critical temperature, the temperature adjusting device is determined to be in the first operation mode;
    if the outdoor air inlet dry-bulb temperature is lower than or equal to the outdoor air inlet critical dry-bulb temperature or the outdoor air inlet wet-bulb temperature is lower than or equal to the outdoor air inlet critical wet-bulb temperature, and the temperature of the heat exchange medium of the inlet end of the third heat exchanger is greater than or equal to the heat exchange medium critical temperature, the temperature adjusting device is determined to be in the second operation mode;
    if the outdoor air inlet wet-bulb temperature is greater than the outdoor air inlet critical wet-bulb temperature, and the temperature of the heat exchange medium of the inlet end of the third heat exchanger is lower than or equal to the heat exchange medium critical temperature, the temperature adjusting device is determined to be in the third operation mode; and
    if the outdoor air inlet wet-bulb temperature is greater than the outdoor air inlet critical wet-bulb temperature, and the temperature of the heat exchange medium of the inlet end of the third heat exchanger is greater than the heat exchange medium critical temperature, the temperature adjusting device is determined to be in the fourth operation mode.

3. The control method according to claim 1, wherein,
in the first operation mode or the second operation mode, the first throttling component is controlled to close, the second throttling component is controlled to open, and the second port and the third port of the reversing valve are connected;
the opening of the second throttling component in the second operation mode is smaller than that of the second throttling component in the first operation mode; and/or
the frequency of the compressor in the second operation mode is smaller than that of the compressor in the first operation mode.

4. The control method according to claim 1, wherein,
in the third operation mode, the first throttling component is controlled to open, the second throttling component is controlled to close, and the second port and the third port of the reversing valve are disconnected; or
in the third operation mode, the first throttling component and the second throttling component are controlled to open, and the second port and the third port of the reversing valve are connected.

5. The control method according to claim 1, wherein,
in the fourth operation mode, the first throttling component and the second throttling component are controlled to open, and the second port and the first port of the reversing valve are connected.

6. A temperature adjusting device, comprising:
a memory and a processor, wherein, the memory stores a program or instruction that can be executed on the processor, and the steps of the control method according to claim 1 are implemented when the processor executes the program or instruction.

* * * * *